United States Patent
Zhang et al.

(10) Patent No.: US 9,161,000 B2
(45) Date of Patent: Oct. 13, 2015

(54) LIGHT PARAMETER MEASUREMENT METHOD AND DEVICE, SCREEN ADJUSTMENT METHOD AND ELECTRONIC DEVICE

(71) Applicant: Lenovo (Beijing) Co., Ltd., Beijing (CN)

(72) Inventors: Zhenhua Zhang, Beijing (CN); Ke Shang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/228,477

(22) Filed: Mar. 28, 2014

(65) Prior Publication Data

US 2015/0062350 A1    Mar. 5, 2015

(30) Foreign Application Priority Data

Aug. 30, 2013 (CN) .......................... 2013 1 0390820

(51) Int. Cl.
*H04N 17/02* (2006.01)
*H04N 9/73* (2006.01)
*H04N 5/58* (2006.01)
*H04N 17/04* (2006.01)

(52) U.S. Cl.
CPC . *H04N 9/73* (2013.01); *H04N 5/58* (2013.01); *H04N 17/04* (2013.01)

(58) Field of Classification Search
CPC ............ H04N 13/022; H04N 13/0402; H04N 13/0425; H04N 17/004; H04N 2013/0081; H04N 5/23241; H04N 5/351; H04N 9/3194; H04N 13/02; H04N 17/002; H04N 5/232; H04N 5/23209; H04N 5/23222; H04N 5/23225; H04N 5/23229; H04N 7/163; H04N 9/045
USPC ........ 348/180, 79, 187, 188, 190, 191, 224.1, 348/370; 345/589, 619
See application file for complete search history.

(56) References Cited

U.S. PATENT DOCUMENTS

| | | | |
|---|---|---|---|
| 6,452,627 B1 * | 9/2002 | Hamaguri et al. ............ | 348/180 |
| 6,700,619 B1 * | 3/2004 | Hamamura ................... | 348/370 |
| 2011/0227939 A1 * | 9/2011 | Inoue ............................ | 345/589 |

* cited by examiner

*Primary Examiner* — Trang U Tran
(74) *Attorney, Agent, or Firm* — Harness, Dickey & Pierce, P.L.C.

(57) ABSTRACT

A method and device for light parameter measurement, a method for screen adjustment and an electronic device are provided. A current image parameter corresponding to a type of a parameter to be measured obtained by a camera under a first operation mode is acquired, a light parameter value corresponding to the current image parameter is determined based on a preset correspondence between an image parameter and a light parameter, and the light parameter value corresponding to the current image parameter is taken as a current light parameter.

11 Claims, 6 Drawing Sheets

LIGHT PARAMETER MEASUREMENT METHOD AND DEVICE, SCREEN ADJUSTMENT METHOD AND ELECTRONIC DEVICE

This application claims the priority to Chinese Patent Application 201310390820.1 entitled "LIGHT PARAMETER MEASUREMENT METHOD AND DEVICE, SCREEN ADJUSTMENT METHOD AND ELECTRONIC DEVICE", filed on Aug. 30, 2013 with Chinese State Intellectual Property Office, which is incorporated herein by reference in its entirety.

FIELD

The disclosure relates to the field of measurement technology, and particularly to light parameter measurement method and device, screen adjustment method and electronic device.

BACKGROUND

With the development of science and technology, products provided with displays, such as a TV set, a mobile phone, a pad and a laptops, become more and more popular in our life and work. As it is well known, a too high or too low brightness and color temperature of a screen will cause a failure in identifying information displayed on the screen, or even harm to eyes. Therefore, it is necessary to adjust parameters such as brightness and color temperature of the display screen based on ambient light.

In some high requirement application occasions, parameters of ambient light need to be measured precisely, and the display is adjusted based on the measurement result. The existing method for measuring the ambient light parameters usually requires special equipment such as a sensor, which though ensures measurement precision, is very expensive and hence unfavorable for promotion and wide application.

SUMMARY

In view of the above, an object of the disclosure is to provide a method for measuring a light parameter and a device thereof, a method for adjusting a screen, and an electronic device, so as to obtain a light parameter measurement result of high precision at low cost.

In order to achieve the above object, a following technical solution is provided in the disclosure.

A method for light parameter measurement, which is applied to an electronic device with a camera, where the camera has at least a first operation mode, and in the first operation mode, light emitted into the camera is diffused.

The method includes:

receiving a measurement instruction and determining a type of a parameter to be measured based on the measurement instruction;

acquiring a current image parameter corresponding to the type of the parameter to be measured obtained by the camera under the first operation mode; and determining a light parameter corresponding to the current image parameter based on a preset correspondence between an image parameter and a light parameter and taking the light parameter corresponding to the current image parameter as a current light parameter.

Preferably, the type of the parameter to be measured includes color temperature, and in a case that the type of the parameter to be measured is determined to be color temperature, the acquiring a current image parameter corresponding to the type of the parameter to be measured obtained by the camera under the first operation mode includes: acquiring a current RGB relative value obtained by the camera under the first operation mode; and the determining a light parameter corresponding to the current image parameter based on a preset correspondence between an image parameter and a light parameter and taking the light parameter corresponding to the current image parameter as a current light parameter includes: determining a color temperature value corresponding to the current RGB relative value based on a preset correspondence between an RGB relative value and color temperature and taking the color temperature value corresponding to the current RGB relative value as a current color temperature value.

Preferably, the type of the parameter to be measured includes light intensity, and in a case that the type of the parameter to be measured is determined to be light intensity, the acquiring a current image parameter corresponding to the type of the parameter to be measured obtained by the camera under the first operation mode includes: acquiring a current RGB absolute value and a current exposure value obtained by the camera under the first operation mode; and the determining a light parameter corresponding to the current image parameter based on a preset correspondence between an image parameter and a light parameter and taking the light parameter corresponding to the current image parameter as a current light parameter includes: determining a light intensity value corresponding to the current RGB absolute value and the current exposure value based on a preset correspondence among an RGB absolute value, an exposure value and light intensity and taking the light intensity value corresponding to the current RGB absolute value and the current exposure value as a current light intensity value.

A method for screen adjustment, which is applied to an electronic device with a camera and a display screen, where the camera has at least a first operation mode, and in the first operation mode, light emitted into the camera is diffused.

The method includes:

receiving an adjustment instruction and determining a type of a parameter to be adjusted of the display screen based on the adjustment instruction;

acquiring a current image parameter corresponding to the type of the parameter to be adjusted obtained by the camera under the first operation mode;

determining a light parameter corresponding to the current image parameter based on a preset correspondence between an image parameter and a light parameter; and adjusting the parameter to be adjusted based on the light parameter corresponding to the current image parameter.

Preferably, the type of the parameter to be adjusted includes color temperature of the display screen, and in a case that the type of the parameter to be adjusted is determined to be color temperature, the acquiring a current image parameter corresponding to the type of the parameter to be adjusted obtained by the camera under the first operation mode includes: acquiring a current RGB relative value obtained by the camera under the first operation mode; and the determining a light parameter corresponding to the current image parameter based on a preset correspondence between an image parameter and a light parameter includes: determining a color temperature value corresponding to the current RGB relative value based on a preset correspondence between an RGB relative value and color temperature; and the adjusting the parameter to be adjusted based on the light parameter corresponding to the current image parameter includes: adjusting the color temperature of the display screen based on the color temperature value corresponding to the current RGB relative value.

Preferably, the type of the parameter to be adjusted includes brightness of the display screen, and in a case that the parameter to be adjusted is determined to be brightness, the acquiring a current image parameter corresponding to the type of the parameter to be adjusted obtained by the camera under the first operation mode includes: acquiring a current RGB absolute value and a current exposure value obtained by the camera under the first operation mode; and the determining a light parameter corresponding to the current image parameter based on a preset correspondence between an image parameter and a light parameter includes: determining a light intensity value corresponding to the current RGB absolute value and the current exposure value based on a preset correspondence among an RGB absolute value, an exposure value and light intensity; and the adjusting the parameter to be adjusted based on the light parameter corresponding to the current image parameter includes: adjusting the brightness of the display screen based on the light intensity value corresponding to the current RGB absolute value and the current exposure value.

A device for light parameter measurement, which is applied to an electronic device with a camera, where the camera has at least a first operation mode, and in the first operation mode, light emitted into the camera is diffused.

The device includes an instruction receiving unit, an image parameter acquiring unit and a parameter determining unit;

the instruction receiving unit is adapted to receive a measurement instruction and determine a type of a parameter to be measured based on the measurement instruction;

the image parameter acquiring unit is adapted to acquire a current image parameter corresponding to the type of the parameter to be measured obtained by the camera under the first operation mode; and the parameter determining unit is adapted to determine a light parameter corresponding to the current image parameter based on a preset correspondence between an image parameter and a light parameter and take the light parameter corresponding to the current image parameter as a current light parameter.

Preferably, the type of the parameter to be measured includes color temperature; the image parameter acquiring unit includes a first parameter acquiring unit; and the parameter determining unit includes a color temperature determining unit;

the first parameter acquiring unit is adapted to acquire a current RGB relative value obtained by the camera under the first operation mode in a case that the instruction receiving unit determines that the type of the parameter to be measured is color temperature; and the color temperature determining unit is adapted to determine a color temperature value corresponding to the current RGB relative value based on a preset correspondence between an RGB relative value and color temperature and take the color temperature value corresponding to the current RGB relative value as a current color temperature value.

Preferably, the type of the parameter to be measured includes light intensity; the image parameter acquiring unit includes a second parameter acquiring unit; and the parameter determining unit includes a light intensity determining unit;

the second parameter acquiring unit is adapted to acquire a current RGB absolute value and a current exposure value obtained by the camera under the first operation mode in a case that the instruction receiving unit determines that the type of the parameter to be measured is light intensity; and the light intensity determining unit is adapted to determine a light intensity value corresponding to the current RGB absolute value and the current exposure value based on a preset correspondence among an RGB absolute value, an exposure value and light intensity and take the light intensity value corresponding to the current RGB absolute value and the current exposure value as a current light intensity value.

An electronic device with a camera, where the camera has at least a first operation mode, and in the first operation mode, light emitted into the camera is diffused; and the electronic device includes a device for light parameter measurement, and the device for light parameter measurement includes an instruction receiving unit, an image parameter acquiring unit and a parameter determining unit, the instruction receiving unit is adapted to receive a measurement instruction and determine a type of a parameter to be measured based on the measurement instruction;

the image parameter acquiring unit is adapted to acquire a current image parameter corresponding to the type of the parameter to be measured obtained by the camera under the first operation mode; and the parameter determining unit is adapted to determine a light parameter corresponding to the current image parameter based on a preset correspondence between an image parameter and a light parameter and take the light parameter corresponding to the current image parameter as a current light parameter.

Preferably, the electronic device further includes a display screen and a screen adjustment unit; and the screen adjustment unit is adapted to adjust a display parameter of the display screen based on the current light parameter.

As can be known from the above technical solutions, a current image parameter corresponding to a type of a parameter to be measured obtained by the camera under the first operation mode is acquired, a light parameter value corresponding to the current image parameter is determined based on a preset correspondence between an image parameter and a light parameter, and the light parameter value corresponding to the current image parameter is taken as a current light parameter. Since in the first operation mode, light emitted into the camera is diffused, i.e., light emitted into the camera is not focused, influence of difference in light emitted from different places of objects in the environment on the current image parameter acquired by the camera is avoided. Therefore, the precision of the above acquired current image parameter is ensured and the precision of light parameter measurement is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the disclosure, and the conventional technical problem is solved.

BRIEF DESCRIPTION OF THE DRAWINGS

In order to more clearly illustrate technical solutions in the embodiments of the disclosure or in the prior art, drawings referred to describe the embodiments or the prior art will be briefly described hereinafter. Apparently, the drawings in the following description are only some embodiments of the present application, and for those skilled in the art, other drawings may be obtained based on these drawings without any creative work.

DETAILED DESCRIPTION

The technical solutions according to the embodiments of the disclosure will be described clearly and completely as follows in conjunction with the appended drawings. Apparently, the described embodiments are not the whole but just part of embodiments of the application. All other embodiments obtained by those skilled in the art based on the embodiments of the disclosure without any creative work belong to the scope of protection of the present application.

A method and device for light parameter measurement, a method for screen adjustment and an electronic device are provided by embodiments of the disclosure, so as to obtain a light parameter measurement result of high precision at low cost.

A method for light parameter measurement is provided according to a first embodiment of the disclosure. The method is applied to an electronic device with a camera, where the camera has at least a first operation mode, and in the first application mode, light emitted into the camera is diffused.

Figure 1:
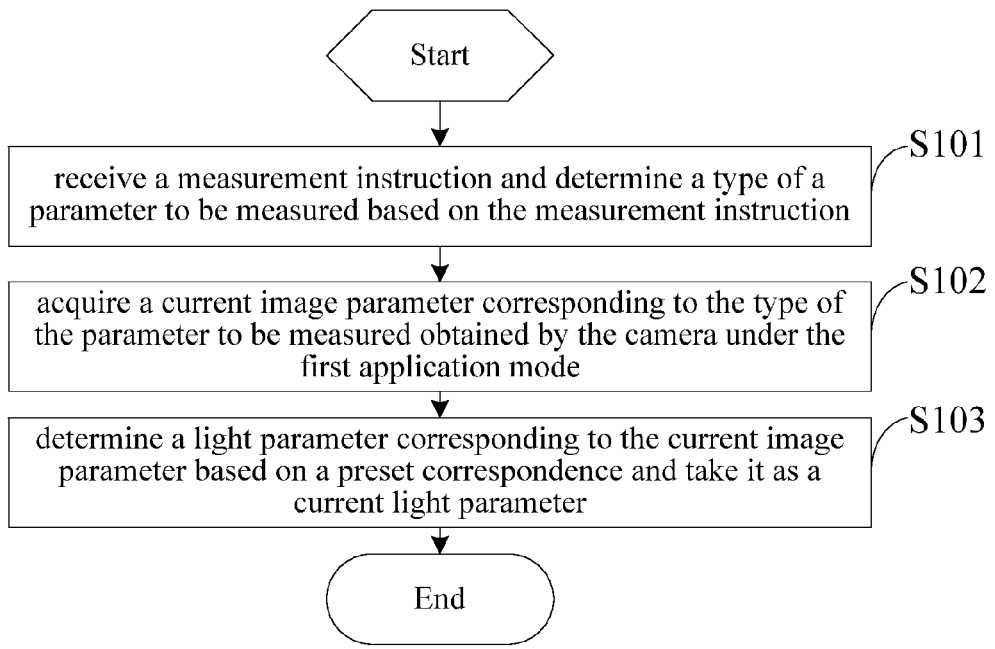
FIG. 1 is a flowchart of a method for light parameter measurement according to a first embodiment of the disclosure.

Referring to FIG. 1, the method for light parameter measurement provided according to the first embodiment of the disclosure includes the following steps S101 to S103.

S101 is receiving a measurement instruction and determining a type of a parameter to be measured based on the measurement instruction.

S102 is acquiring a current image parameter corresponding to the type of the parameter to be measured obtained by the camera under the first operation mode.

S103 is determining a light parameter corresponding to the current image parameter based on a preset correspondence between an image parameter and a light parameter and taking the light parameter corresponding to the current image parameter as a current light parameter.

Since different types of image parameters are required to measure different types of light parameters, it is necessary to determine the type of the parameter to be measured based on the measurement instruction, so as to extract a current image parameter required for measuring this type of light parameter from multiple image parameters obtained by the camera under the first operation mode, and finally determine the light parameter value corresponding to the current image parameter based on a preset correspondence between an image parameter and a light parameter. The light parameter value is a current light parameter, i.e., a measurement object.

As can be known from the above, a current image parameter corresponding to a type of a parameter to be measured obtained by the camera under the first operation mode is acquired, a light parameter value corresponding to the current image parameter is determined based on a preset correspondence between an image parameter and a light parameter, and the light parameter value corresponding to the current image parameter is taken as a current light parameter. Since in the first operation mode, light emitted into the camera is diffused, i.e., light emitted into the camera is not focused, influence of difference in light emitted from different places of objects in the environment on the current image parameter acquired by the camera is avoided. Therefore, the precision of the above acquired current image parameter is ensured and the precision of light parameter measurement is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the embodiment of the disclosure, and the conventional technical problem is solved.

In the embodiment of the disclosure, in measuring the light parameter, the camera is under the first operation mode in which light emitted into the camera is diffused. The focal length of the camera under this mode is generally too small to form a clear image. More specifically, the focal length of optical zoom of the camera is set within 50 mm, but the disclosure is not limited thereto.

In addition, in order to avoid measurement errors caused by camera's built-in functions such as image enhancement function, it is necessary to shut down the camera's image enhancement function (such as sharpness enhancement function and saturation enhancement function), turn off the flash and set the white balance mode to be an auto white balance during the measurement.

In addition to the first operation mode, the camera has a second operation mode. In the second operation mode, light emitted into the camera is focused to form an image with a clear outline, so as to achieve the common function of the camera, i.e., shooting an object. Similarly, the camera is controlled to operate under the second operation mode by adjusting the focal length of the camera.

There are multiple types of light parameters. Hereunder color temperature measurement is taken as an example to illustrate in detail the method for light parameter measurement provided in the disclosure.

Figure 2:
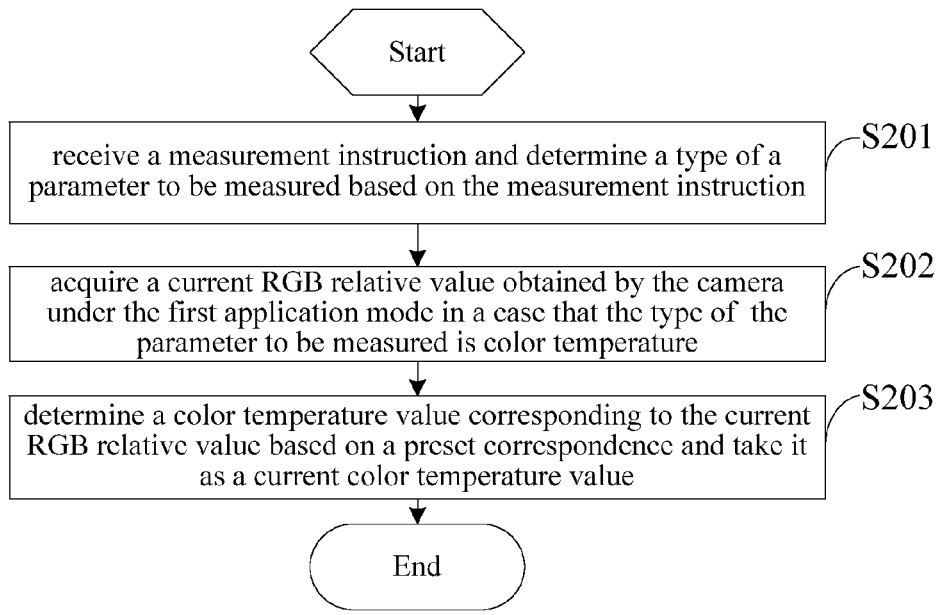
FIG. 2 is a flowchart of a method for light parameter measurement according to a second embodiment of the disclosure.

A method for light parameter measurement is provided according to a second embodiment of the disclosure. The method is applied to an electronic device with a camera, where the camera has at least a first operation mode, and in the first operation mode, light emitted into the camera is diffused. As shown in FIG. 2, the method includes the following steps S201 to S203.

S201 is receiving a measurement instruction and determining a type of a parameter to be measured based on the measurement instruction.

S202 is acquiring a current RGB relative value obtained by the camera under the first operation mode in a case that the type of the parameter to be measured is determined to be color temperature in step S201.

S203 is determining a color temperature value corresponding to the current RGB relative value obtained in step S202 based on a preset correspondence between an RGB relative value and color temperature and taking the color temperature value corresponding to the current RGB relative value as a current color temperature value.

The above RGB relative value is a proportion between absolute values of any two colors of the three primary colors of R (Red), G (Green) and B (Blue) of the image obtained by the camera under a first operation mode, such as a relative value between red and blue R/B.

Since there is a fixed correspondence, i.e., the above preset correspondence, between color temperature and the RGB relative value, the current color temperature value may be determined based on the preset correspondence by the precise RGB relative value obtained by the camera under the first operation mode.

As can be known from the above, a current RGB relative value obtained by the camera under the first operation mode is acquired, a color temperature value corresponding to the current RGB relative value is determined based on a preset correspondence between color temperature and an RGB relative value, and the color temperature value corresponding to the current RGB relative value is taken as a current color temperature value. In this way, the color temperature measurement is achieved. Since in the first operation mode, light emitted into the camera is diffused, i.e., light emitted into the camera is not focused, influence of difference in light emitted from different places of objects in the environment on the current RGB relative value acquired by the camera is avoided. Therefore, the precision of the above acquired current RGB relative value is ensured and the precision of color temperature measurement is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the disclosure, and the conventional technical problem is solved.

Only a method for measuring one type of the light parameter is described in the second embodiment above. In practice, two or more types of light parameters may need to be measured. Therefore, a method for measuring color temperature and light intensity of light is provided according to a third embodiment of the disclosure. It should be noted that, measuring the color temperature and the light intensity of light is only a specific embodiment of the disclosure, and other embodiments for measuring one or more other types of ambient parameters without departing from the spirit and principle of the disclosure all belong to the scope of protection of this disclosure.

Figure 3:
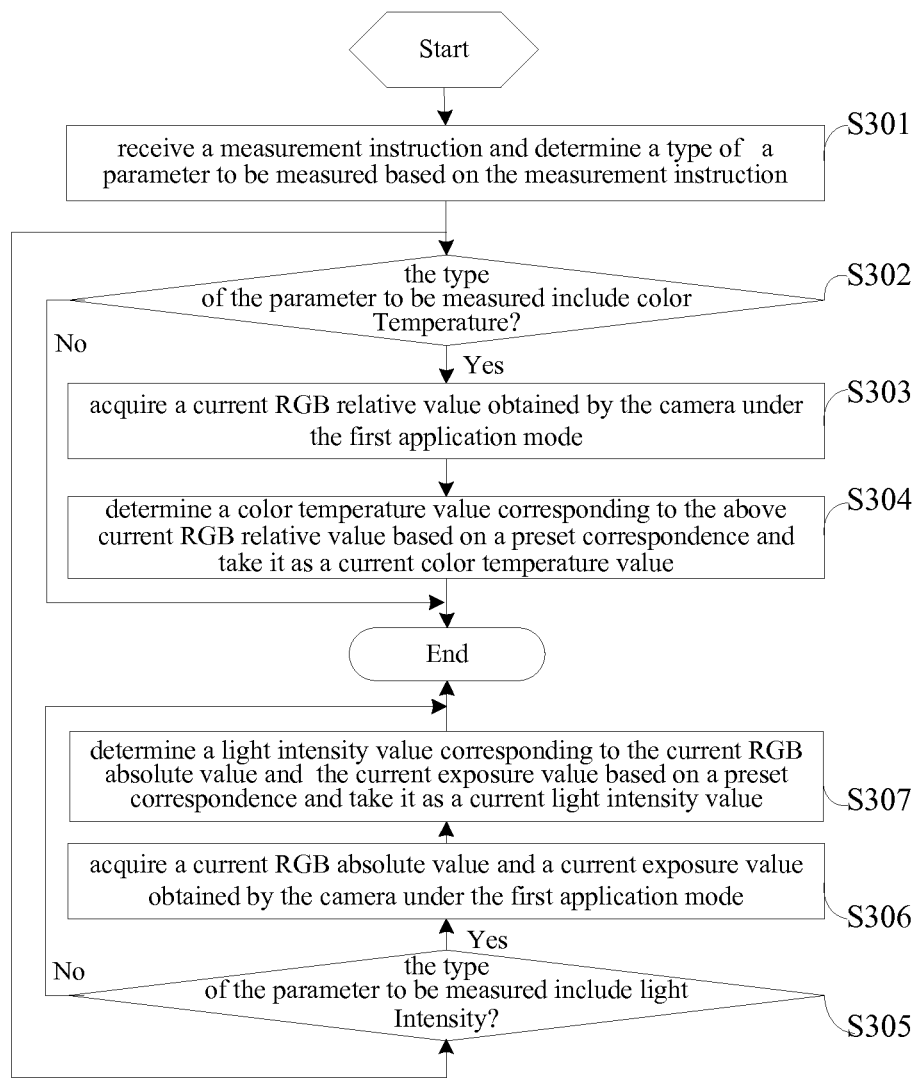
FIG. 3 is a flowchart of a method for light parameter measurement according to a third embodiment of the disclosure.

A method for light parameter measurement is provided according to the third embodiment of the disclosure. The method is applied to an electronic device with a camera, where the camera has at least a first operation mode, and in the first operation mode, light emitted into the camera is diffused. As shown in FIG. 3, the method includes the following steps S301 to S307.

S301 is receiving a measurement instruction and determining a type of a parameter to be measured based on the measurement instruction. Step S302 and step S305 are then performed respectively.

S302 is determining whether the type of the parameter to be measured determined in step S301 includes color temperature, and in a case that the type of the parameter to be measured determined in step S301 includes color temperature, proceeding to step S303, and in a case that the type of the parameter to be measured determined in step S301 does not include color temperature, not performing the color temperature measurement.

S303 is acquiring a current RGB relative value obtained by the camera under the first operation mode.

S304 is determining a color temperature value corresponding to the current RGB relative value based on a preset correspondence between an RGB relative value and color temperature, and taking the color temperature value corresponding to the current RGB relative value as a current color temperature value. After this, the color temperature measurement ends.

S305 is determining whether the type of the parameter to be measured determined in step S301 includes light intensity, and in a case that the type of the parameter to be measured determined in step S301 includes light intensity, proceeding to step S306, and in a case that the type of the parameter to be measured determined in step S301 does not include light intensity, not performing the light intensity measurement.

S306 is acquiring a current RGB absolute value and a current exposure value obtained by the camera under the first operation mode.

S307 is determining a light intensity value corresponding to the current RGB absolute value and the current exposure value based on a preset correspondence among an RGB absolute value, an exposure value and light intensity, and taking the light intensity value corresponding to the current RGB absolute value and the current exposure value as a current light intensity value. After this, the light intensity measurement ends.

As can be known from the third embodiment above, corresponding current image parameters obtained by the camera under the first operation mode are acquired based on different types of light parameters to be measured, and current light parameters corresponding to each type of the current image parameter are determined based on corresponding preset correspondences. That is, in a case that the type of the light parameter to be measured includes only color temperature, only a current RGB relative value is obtained by the camera under the first operation mode, and a current color temperature value is determined; and in a case that the type of the light parameter to be measured includes both color temperature and light intensity, a current RGB relative value and a current RGB absolute value are obtained by the camera under the first operation mode, and a current color temperature value and a current light intensity value of light are determined based on a preset correspondence between an RGB relative value and color temperature and a preset correspondence between an RGB absolute value and light intensity respectively. Therefore, in the embodiment of the disclosure, a light parameter measurement result of high precision is obtained at low cost by using the first operation mode of the camera and the conventional technical problem is solved; furthermore, measurement of two or more types of light parameters is achieved, which reduces the number of measurement devices and further reduces the measurement cost.

Corresponding to the above embodiments of the method for light parameter measurement, a method for screen adjustment is further provided according to a fourth embodiment of the disclosure. The method is applied to an electronic device with a camera and a display screen, where the camera has at least a first operation mode, and in the first operation mode, light emitted into the camera is diffused.

Figure 4:
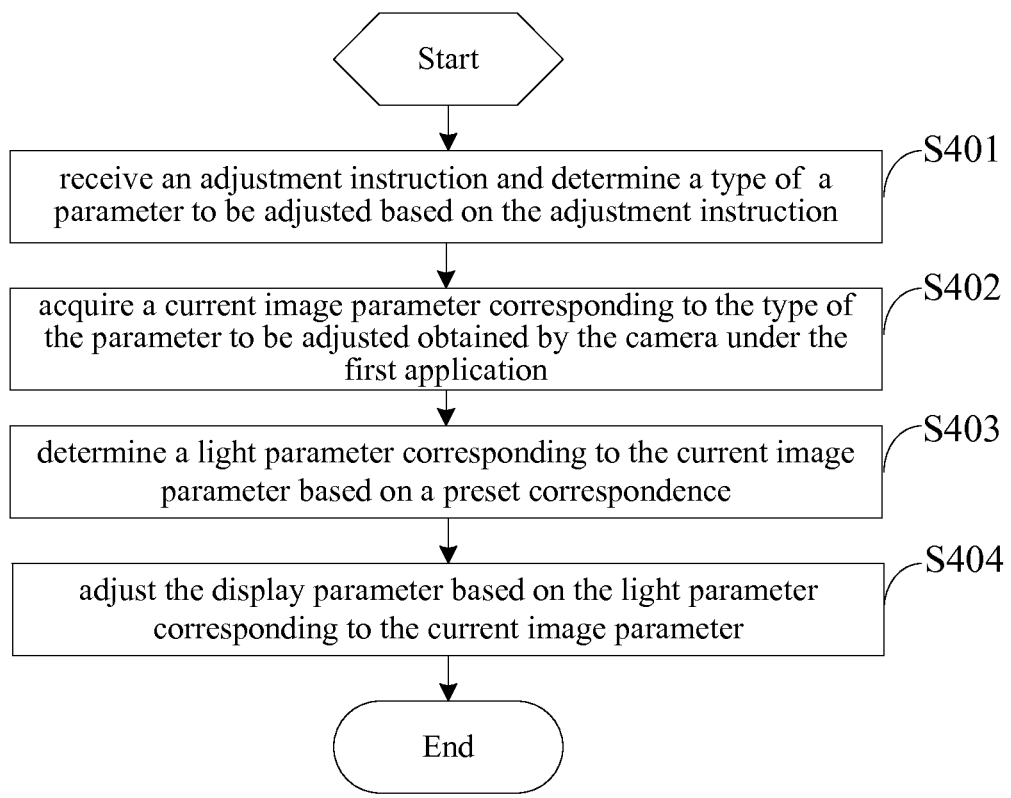
FIG. 4 is a flowchart of a method for screen adjustment according to a fourth embodiment of the disclosure.

Referring to FIG. 4, the above screen adjustment method includes the following steps S401 to S404.

S401 is receiving an adjustment instruction and determining a type of a parameter to be adjusted based on the adjustment instruction.

S402 is acquiring a current image parameter corresponding to the type of the parameter to be adjusted obtained by the camera under the first operation mode.

S403 is determining a light parameter corresponding to the current image parameter acquired in step S402 based on a preset correspondence between an image parameter and a light parameter.

S404 is adjusting the parameter to be adjusted of the display based on the light parameter corresponding to the current image parameter determined in step S403.

As can be known from the above, a current image parameter corresponding to the type of the parameter to be adjusted obtained by the camera under the first operation mode is acquired, a light parameter value corresponding to the above current image parameter is determined based on a preset correspondence between an image parameter and a light parameter, and the display parameter of the display is adjusted based on the above light parameter corresponding to the current image parameter. Since in the first operation mode, light emitted into the camera is diffused, i.e., light emitted into the camera is not focused, influence of difference in light emitted from different places of objects in the environment on the current image parameter acquired by the camera is avoided. Therefore, the precision of the above acquired current image parameter is ensured, that is, the precision of light parameter measurement is ensured, and the precision of screen adjustment is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the embodiment of the disclosure, and the conventional technical problem is solved.

There are multiple types of display parameters of a display, and correspondingly, light parameters needed to be measured are different. Adjustment to color temperature of a display is taken as an example hereunder to illustrate the method for screen adjustment provided in the disclosure.

Figure 5:
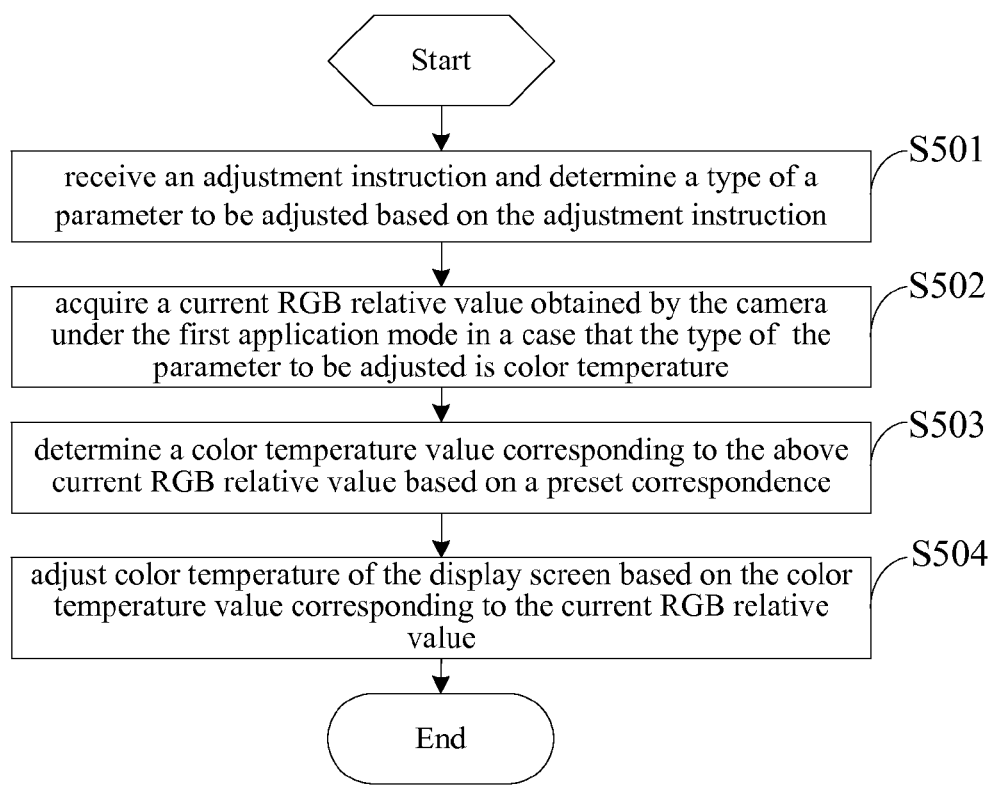
FIG. 5 is a flowchart of a method for screen adjustment according to a fifth embodiment of the disclosure.

A method for screen adjustment is provided according to a fifth embodiment of the disclosure. The method is applied to an electronic device with a camera and a display screen, where the camera has at least a first operation mode, and in the first operation mode, light emitted into the camera is diffused. As shown in FIG. 5, the method includes the following steps S501 to S504.

S501 is receiving an adjustment instruction and determining a type of a parameter to be adjusted of the display screen based on the adjustment instruction.

S502 is acquiring a current RGB relative value obtained by the camera under the first operation mode in a case that the type of the parameter to be adjusted determined in step S501 is color temperature.

S503 is determining a color temperature value corresponding to the current RGB relative value acquired in step S202 based on a preset correspondence between an RGB relative value and color temperature.

S504 is adjusting color temperature of the display screen based on the color temperature value corresponding to the current RGB relative value determined in step S503.

As can be known from the above, a current RGB relative value obtained by the camera under the first operation mode is acquired, a color temperature value corresponding to the current RGB relative value is determined based on a preset correspondence between color temperature and an RGB relative value, and the color temperature of the display is adjusted based on the color temperature value corresponding to the current RGB relative value. Since in the first operation mode, light emitted into the camera is diffused, i.e., light emitted into the camera is not focused, influence of difference in light emitted from different places of objects in the environment on the current RGB relative value acquired by the camera is avoided. Therefore, the precision of the above acquired current RGB relative value is ensured, the precision of color temperature measurement is ensured, and the precision of color temperature adjustment of the screen is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the disclosure, and the conventional technical problem is solved.

Only a method for measuring one type of the display parameter is described in the fifth embodiment above. In practice, two or more types of display parameters may need to be adjusted. Therefore, a method for adjusting color temperature and brightness of a display is provided according to a sixth embodiment of the disclosure. It should be noted that, adjusting the color temperature and the brightness is only a specific embodiment of the disclosure, and other embodiments for measuring one or more other types of display parameters without departing from the spirit and principle of the disclosure all belong to the scope of protection of this disclosure.

Figure 6:
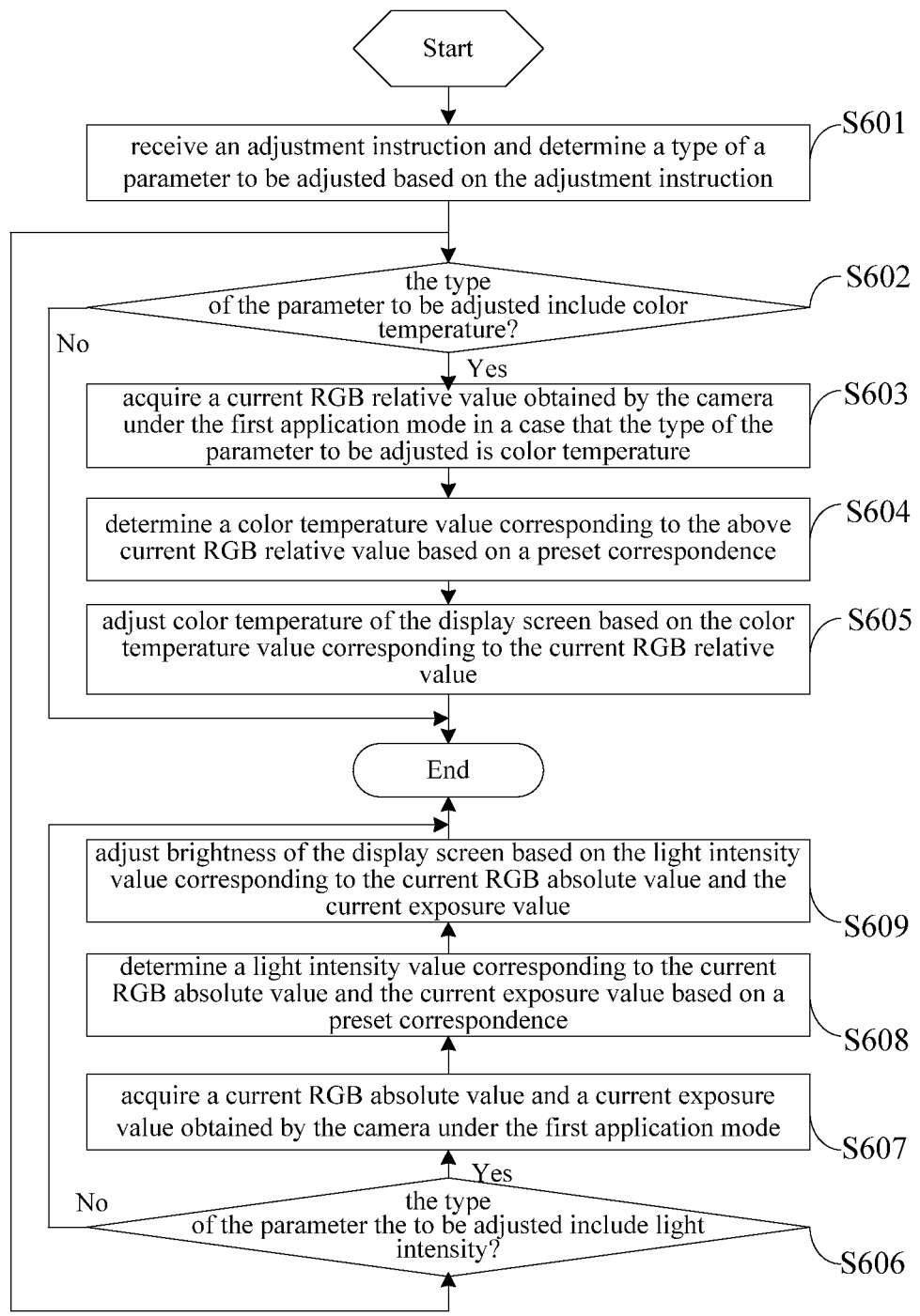
FIG. 6 is a flowchart of a method for screen adjustment according to a sixth embodiment of the disclosure.

A method for screen adjustment is provided according to the sixth embodiment of the disclosure. The method is applied to an electronic device with a camera and a display screen, where the camera has at least a first operation mode, and in the first operation mode, light emitted into the camera is diffused. As shown in FIG. 6, the method includes the following steps S601 to S609.

S601 is receiving an adjustment instruction and determining a type of a parameter to be adjusted based on the adjustment instruction. Step S602 and step S606 are then performed respectively.

S602 is determining whether the type of the parameter to be adjusted determined in step S601 includes color temperature, and in a case that the type of the parameter to be adjusted determined in step S601 includes color temperature, proceeding to step S603, and in a case that the type of the parameter to be adjusted determined in step S601 does not include color temperature, not performing the color temperature adjustment.

S603 is acquiring a current RGB relative value obtained by the camera under the above first operation mode.

S604 is determining a color temperature value corresponding to the current RGB relative value acquired in step S202 based on a preset correspondence between an RGB relative value and color temperature.

S605 is adjusting color temperature of the display screen based on the color temperature value corresponding to the current RGB relative value determined in step S604. After this, the color temperature adjustment ends.

S606 is determining whether the type of the parameter to be adjusted includes brightness, and in a case that the type of the parameter to be adjusted includes brightness, proceeding to step S607, and in a case that the type of the parameter to be adjusted does not include brightness, not performing the brightness adjustment.

S607 is acquiring a current RGB absolute value and a current exposure value obtained by the camera under the first operation mode.

S608 is determining a light intensity value corresponding to the current RGB absolute value and the current exposure value based on a preset correspondence among an RGB absolute value, an exposure value and light intensity.

S609 is adjusting brightness of the display screen based on the light intensity value corresponding to the current RGB absolute value and the current exposure value determined in step S608. After this, brightness adjustment of the display screen ends.

As can be known from the sixth embodiment above, corresponding current image parameters obtained by the camera under the first operation mode are acquired based on different types of parameters to be adjusted, light parameters corresponding to each type of the current image parameter are determined based on corresponding preset correspondences, and display parameters of the display screen are adjusted based on the corresponding light parameters. That is, in a case that the type of the parameter to be adjusted includes only color temperature, only a current RGB relative value is obtained by the camera under the first operation mode, a current color temperature value is determined accordingly and the color temperature of the display screen is adjusted based on the current color temperature value; and in a case that the type of the parameter to be adjusted includes both color temperature and light intensity, a current RGB relative value and a current RGB absolute value are obtained by the camera under the first operation mode, a current color temperature value and a current light intensity value of light are determined based on a preset correspondence between an RGB relative value and color temperature and a preset correspondence between an RGB absolute value and light intensity, and the color temperature and brightness of the display screen are adjusted based on the current color temperature value and the current light intensity value respectively. Therefore, in the embodiment of the disclosure, a light parameter measurement result of high precision is obtained at low cost by using the first operation mode of the camera and the conventional technical problem is solved; furthermore, measurement of two or more types of display parameters is achieved, which reduces the number of measurement and adjustment devices and further reduces the measurement cost.

Corresponding to the above method for light parameter measurement, a device for light parameter measurement is further provided by the embodiment of the disclosure. The device for light parameter measurement is applied to an electronic device with a camera; where the camera has at least a first operation mode, and in the first operation mode, light emitted into the camera is diffused.

Figure 7:
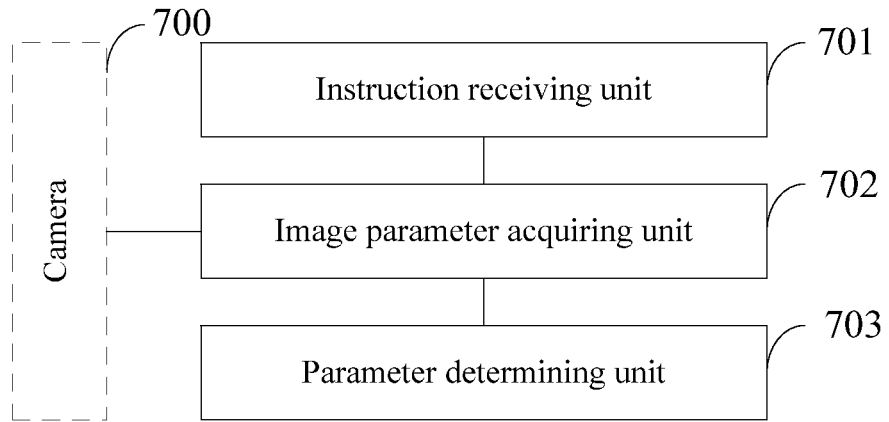
FIG. 7 is a structural diagram of a device for light parameter measurement according to a seventh embodiment of the disclosure.

As shown in FIG. 7, a device for light parameter measurement provided in a seventh embodiment of the disclosure includes an instruction receiving unit 701, an image parameter acquiring unit 702 and a parameter determining unit 703 connected sequentially.

The working process of the above device for light parameter measurement is as follows: receiving, by the instruction receiving unit 701, a measurement instruction and determining a type of a parameter to be measured based on the measurement instruction; acquiring, by the image parameter acquiring unit 702, a current image parameter corresponding to the type of the parameter to be measured obtained by the camera 700 under the first operation mode; determining, by the parameter determining unit 703, a light parameter corresponding to the current image parameter based on a preset correspondence between an image parameter and a light parameter and taking the light parameter corresponding to the current image parameter as a current light parameter.

As can be known from the above structure and working process, a current image parameter corresponding to a type of a parameter to be measured obtained by the camera under the first operation mode is acquired, a light parameter value corresponding to the current image parameter is determined based on a preset correspondence between an image parameter and a light parameter, and the light parameter value corresponding to the current image parameter is taken as a current light parameter. Since in the first operation mode, light emitted into the camera is diffused, i.e., light emitted into the camera is not focused, influence of difference in light emitted from different places of objects in the environment on the current image parameter acquired by the camera is avoided. Therefore, the precision of the above acquired current image parameter is ensured and the precision of light parameter measurement is further ensured. In addition, as the camera adopted in the disclosure may be a common camera at low cost, and no special equipment such as a sensor is necessary, the cost for light parameter measurement is greatly reduced. Hence, a light parameter measurement result of high precision is obtained at low cost in the embodiment of the disclosure, and the conventional technical problem is solved.

Figure 8:
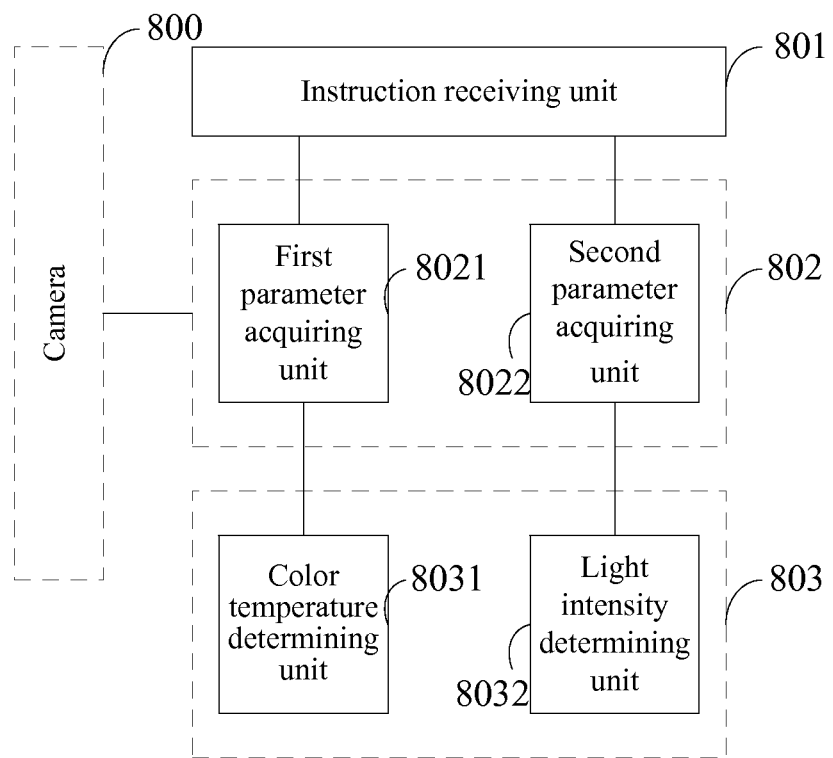
FIG. 8 is a structural diagram of a device for light parameter measurement according to an eighth embodiment of the disclosure.

Furthermore, since there are multiple types of light parameters, the device for light parameter measurement provided in an eighth embodiment of the disclosure includes an instruction receiving unit 801, an image parameter acquiring unit 802 and a parameter determining unit 803, as shown in FIG. 8, where the image parameter acquiring unit 802 includes at least one of a first parameter acquiring unit 8021 and a second parameter acquiring unit 8022; and correspondingly, the parameter determining unit 803 includes one or both of a color temperature determining unit 8031 and a light intensity determining unit 8032.

The working process of the above device includes: receiving, by the instruction receiving unit 801, a measurement instruction and determining a type of a parameter to be measured based on the measurement instruction; in a case that the type of the parameter to be measured determined by the instruction receiving unit 801 includes color temperature, acquiring, by the first parameter acquiring unit 8021, a current RGB relative value obtained by the camera 800 under the first operation mode; and determining, by the color temperature determining unit 8031, a color temperature value corresponding to the current RGB relative value acquired by the first parameter acquiring unit 8021 based on a correspondence between an RGB relative value and color temperature, and taking the color temperature value corresponding to the current RGB relative value as a current color temperature value; and in a case that the type of the parameter to be measured determined by the instruction receiving unit 801 includes light intensity, acquiring, by the second parameter acquiring unit 8022, a current RGB absolute value and a current exposure value obtained by the camera 800 under the first operation mode; and determining, by the light intensity determining unit 8032, a light intensity value corresponding to the current RGB absolute value and the current exposure value based on a preset correspondence among an RGB absolute value, an exposure value and light intensity, and taking the light intensity value corresponding to the current RGB absolute value and the current exposure value as a current light intensity value.

As can be known from the eighth embodiment, corresponding current image parameters obtained by the camera under the first operation mode are acquired based on different types of light parameters to be measured, and current light parameters corresponding to each type of the current image parameter are determined based on corresponding preset correspondences. That is, in a case that the type of the light parameter to be measured includes only color temperature, only a current RGB relative value is obtained by the camera under the first operation mode, and a current color temperature value is determined; and in a case that the type of the light parameter to be measured includes both color temperature and light intensity, a current RGB relative value and a current RGB absolute value are obtained by the camera under the first operation mode, and a current color temperature value and a current light intensity value of light are determined based on a preset correspondence between an RGB relative value and color temperature and a preset correspondence between an RGB absolute value and light intensity respectively. Therefore, in the embodiment of the disclosure, a light parameter measurement result of high precision is obtained at low cost by using the first operation mode of the camera and the conventional technical problem is solved; furthermore, measurement of two or more types of light parameters is achieved, which reduces the number of measurement devices and further reduces the measurement cost.

Corresponding to the above device for light parameter measurement, an electronic device including a camera and any of the above light parameter measurement devices is further provided by an embodiment of the disclosure. The camera has at least a first operation mode, and in the first operation mode, light emitted into the camera is diffused. The device for light parameter measurement is adapted to determine a current light parameter based on an image parameter obtained by the above camera under the first operation mode.

In addition to the above light parameter measurement device, a screen adjustment unit may be provided for the electronic device with a display screen. The screen adjustment unit is adapted to adjust the display parameter of the display screen based on the current light parameter determined by the light parameter measurement device, to make it adapt to the ambient light, which not only improves the display effect of the display screen, but also is beneficial for eyes of those who use the electronic device.

As can be understood by those skilled in the art, the whole or part of the procedures for achieving the method in the above embodiments may be implemented by instructing a relevant hardware by a computer program. The program may be stored in a computer readable storage medium. The program, when being executed, may perform the processes as illustrated in the above method embodiments. The storage medium may be a disk, an optical disk, a Read-Only Memory (ROM) or a Random Access Memory (RAM).

With the above description of the disclosed embodiments, those skilled in the art can practice or use the disclosure. Various modifications to the embodiments are apparent for those skilled in the art. The general principle defined herein can be implemented in other embodiments without departing from the spirit or scope of the present application. Therefore, the present application should not be limited to the embodiments disclosed herein, but has the widest scope that is in conformity with the principle and the novel features disclosed herein.

The invention claimed is:

1. A method for light parameter measurement, which is applied to an electronic device with a camera, wherein the camera has at least a first operation mode, and in the first operation mode, light emitted into the camera is diffused;
the method comprises:
  receiving a measurement instruction and determining a type of a parameter to be measured based on the measurement instruction;
  acquiring a current image parameter corresponding to the type of the parameter to be measured obtained by the camera under the first operation mode; and
  determining a light parameter corresponding to the current image parameter based on a preset correspondence between an image parameter and a light parameter and taking the light parameter corresponding to the current image parameter as a current light parameter.

2. The method according to claim 1, wherein the type of the parameter to be measured comprises color temperature, and
  in a case that the type of the parameter to be measured is determined to be color temperature,
  the acquiring a current image parameter corresponding to the type of the parameter to be measured obtained by the camera under the first operation mode comprises: acquiring a current RGB relative value obtained by the camera under the first operation mode; and
  the determining a light parameter corresponding to the current image parameter based on a preset correspondence between an image parameter and a light parameter and taking the light parameter corresponding to the current image parameter as a current light parameter comprises: determining a color temperature value corresponding to the current RGB relative value based on a preset correspondence between an RGB relative value and color temperature and taking the color temperature value corresponding to the current RGB relative value as a current color temperature value.

3. The method according to claim 1, wherein the type of the parameter to be measured comprises light intensity, and
  in a case that the type of the parameter to be measured is determined to be light intensity,
  the acquiring a current image parameter corresponding to the type of the parameter to be measured obtained by the camera under the first operation mode comprises: acquiring a current RGB absolute value and a current exposure value obtained by the camera under the first operation mode; and
  the determining a light parameter corresponding to the current image parameter based on a preset correspondence between an image parameter and a light parameter and taking the light parameter corresponding to the current image parameter as a current light parameter comprises: determining a light intensity value corresponding to the current RGB absolute value and the current exposure value based on a preset correspondence among an RGB absolute value, an exposure value and light intensity and taking the light intensity value corresponding to the current RGB absolute value and the current exposure value as a current light intensity value.

4. The method according to claim 2, wherein the type of the parameter to be measured comprises light intensity, and
  in a case that the type of the parameter to be measured is determined to be light intensity,
  the acquiring a current image parameter corresponding to the type of the parameter to be measured obtained by the camera under the first operation mode comprises: acquiring a current RGB absolute value and a current exposure value obtained by the camera under the first operation mode; and
  the determining a light parameter corresponding to the current image parameter based on a preset correspondence between an image parameter and a light parameter and taking the light parameter corresponding to the current image parameter as a current light parameter comprises: determining a light intensity value corresponding to the current RGB absolute value and the current exposure value based on a preset correspondence among an RGB absolute value, an exposure value and light intensity and taking the light intensity value corresponding to the current RGB absolute value and the current exposure value as a current light intensity value.

5. A method for screen adjustment, which is applied to an electronic device with a camera and a display screen, wherein the camera has at least a first operation mode, and in the first operation mode, light emitted into the camera is diffused;

the method comprises:
receiving an adjustment instruction and determining a type of a parameter to be adjusted of the display screen based on the adjustment instruction;
acquiring a current image parameter corresponding to the type of the parameter to be adjusted obtained by the camera under the first operation mode;
determining a light parameter corresponding to the current image parameter based on a preset correspondence between an image parameter and a light parameter; and
adjusting the parameter to be adjusted based on the light parameter corresponding to the current image parameter.

6. The method according to claim 5, wherein the type of the parameter to be adjusted comprises color temperature of the display screen, and in a case that the type of the parameter to be adjusted is determined to be color temperature,
the acquiring a current image parameter corresponding to the type of the parameter to be adjusted obtained by the camera under the first operation mode comprises: acquiring a current RGB relative value obtained by the camera under the first operation mode;
the determining a light parameter corresponding to the current image parameter based on a preset correspondence between an image parameter and a light parameter comprises: determining a color temperature value corresponding to the current RGB relative value based on a preset correspondence between an RGB relative value and color temperature; and
the adjusting the parameter to be adjusted based on the light parameter corresponding to the current image parameter comprises: adjusting the color temperature of the display screen based on the color temperature value corresponding to the current RGB relative value.

7. The method according to claim 5, wherein the type of the parameter to be adjusted comprises brightness of the display screen, and in a case that the type of the parameter to be adjusted is determined to be brightness,
the acquiring a current image parameter corresponding to the type of the parameter to be adjusted obtained by the camera under the first operation mode comprises: acquiring a current RGB absolute value and a current exposure value obtained by the camera under the first operation mode;
the determining a light parameter corresponding to the current image parameter based on a preset correspondence between an image parameter and a light parameter comprises: determining a light intensity value corresponding to the current RGB absolute value and the current exposure value based on a preset correspondence among an RGB absolute value, an exposure value and light intensity; and
the adjusting the parameter to be adjusted based on the light parameter corresponding to the current image parameter comprises: adjusting the brightness of the display screen based on the light intensity value corresponding to the current RGB absolute value and the current exposure value.

8. The method according to claim 6, wherein the type of the parameter to be adjusted comprises brightness of the display screen, and in a case that the type of the parameter to be adjusted is determined to be brightness,
the acquiring a current image parameter corresponding to the type of the parameter to be adjusted obtained by the camera under the first operation mode comprises: acquiring a current RGB absolute value and a current exposure value obtained by the camera under the first operation mode;
the determining a light parameter corresponding to the current image parameter based on a preset correspondence between an image parameter and a light parameter comprises: determining a light intensity value corresponding to the current RGB absolute value and the current exposure value based on a preset correspondence among an RGB absolute value, an exposure value and light intensity; and
the adjusting the parameter to be adjusted based on the light parameter corresponding to the current image parameter comprises: adjusting the brightness of the display screen based on the light intensity value corresponding to the current RGB absolute value and the current exposure value.

9. A device for light parameter measurement, which is applied to an electronic device with a camera, wherein the camera has at least a first operation mode, and in the first operation mode, light emitted into the camera is diffused;

the device comprises an instruction receiving unit, an image parameter acquiring unit and a parameter determining unit,
the instruction receiving unit is adapted to receive a measurement instruction and determine a type of a parameter to be measured based on the measurement instruction;
the image parameter acquiring unit is adapted to acquire a current image parameter corresponding to the type of the parameter to be measured obtained by the camera under the first operation mode; and
the parameter determining unit is adapted to determine a light parameter corresponding to the current image parameter based on a preset correspondence between an image parameter and a light parameter and take the light parameter corresponding to the current image parameter as a current light parameter.

10. The device according to claim 9, wherein the type of the parameter to be measured comprises color temperature; the image parameter acquiring unit comprises a first parameter acquiring unit; and the parameter determining unit comprises a color temperature determining unit;

the first parameter acquiring unit is adapted to acquire a current RGB relative value obtained by the camera under the first operation mode in a case that the instruction receiving unit determines that the type of the parameter to be measured is color temperature; and
the color temperature determining unit is adapted to determine a color temperature value corresponding to the current RGB relative value based on a preset correspondence between an RGB relative value and color temperature and take the color temperature value corresponding to the current RGB relative value as a current color temperature value.

11. The device according to claim 9, wherein the type of the parameter to be measured comprises light intensity; the image parameter acquiring unit comprises a second parameter acquiring unit; and the parameter determining unit comprises a light intensity determining unit;

the second parameter acquiring unit is adapted to acquire a current RGB absolute value and a current exposure value obtained by the camera under the first operation mode in a case that the instruction receiving unit determines that the type of the parameter to be measured is light intensity; and the light intensity determining unit is adapted to determine a light intensity value corresponding to the current RGB absolute value and the current exposure value based on a preset correspondence among an RGB absolute value, an exposure value and light intensity and take the light intensity value corresponding to the current RGB absolute value and the current exposure value as a current light intensity value.

* * * * *